US008602798B2

(12) United States Patent
Downing

(10) Patent No.: US 8,602,798 B2
(45) Date of Patent: Dec. 10, 2013

(54) SADDLE CLAMP HAVING ELECTRICAL BONDING CHARACTER

(75) Inventor: Mark L. Downing, Oakwood Hills, IL (US)

(73) Assignee: Illinois Tool Works Inc., Glenview, IL (US)

(*) Notice: Subject to any disclaimer, the term of this patent is extended or adjusted under 35 U.S.C. 154(b) by 64 days.

(21) Appl. No.: 13/504,701

(22) PCT Filed: Oct. 26, 2010

(86) PCT No.: PCT/US2010/054049
§ 371 (c)(1),
(2), (4) Date: Apr. 27, 2012

(87) PCT Pub. No.: WO2011/053573
PCT Pub. Date: May 5, 2011

(65) Prior Publication Data
US 2012/0214328 A1 Aug. 23, 2012

Related U.S. Application Data

(60) Provisional application No. 61/256,693, filed on Oct. 30, 2009.

(51) Int. Cl.
H01R 4/66 (2006.01)
H01R 13/648 (2006.01)

(52) U.S. Cl.
USPC ............................................. 439/100; 248/65

(58) Field of Classification Search
USPC .......... 439/100, 101, 345; 248/65, 71.1, 74.4, 248/230.1, 230.5
See application file for complete search history.

(56) References Cited

U.S. PATENT DOCUMENTS

| 3,227,406 | A | * | 1/1966 | Shelton et al. | 248/74.4 |
| 5,014,940 | A | * | 5/1991 | Sherman | 248/74.1 |
| 5,215,281 | A | * | 6/1993 | Sherman | 248/74.1 |
| 5,934,916 | A | | 8/1999 | Latal et al. | |
| 6,371,774 | B2 | | 4/2002 | Royer | |
| 6,840,782 | B1 | | 1/2005 | Borden et al. | |
| 7,350,755 | B1 | * | 4/2008 | Harrison | 248/230.6 |
| 7,770,848 | B2 | * | 8/2010 | Johnson et al. | 248/65 |
| 2009/0265895 | A1 | * | 10/2009 | Box | 24/20 R |

FOREIGN PATENT DOCUMENTS

| DE | 7204317 U | 4/1972 |
| EP | 0139980 A1 | 5/1985 |
| EP | 0139980 A2 | 5/1985 |
| GB | 143172 | 5/1920 |

OTHER PUBLICATIONS

ISR for PCT/US2010/054049 dated Feb. 17, 2011.

* cited by examiner

Primary Examiner — Hae Moon Hyeon
(74) Attorney, Agent, or Firm — Lowe Hauptman & Ham, LLP

(57) ABSTRACT

A saddle clamp which incorporates internal electrical bonding elements adapted to maintain electrical contact with a clamped tube structure without transferring structural load between the tube and the electrical bonding components. The saddle clamp includes an inner tube contacting surface having at least one surface groove. At least one electrical contact element extends between portions of the inner tube contacting surface. The electrical contact element includes tube contact segment disposed in opposing relation to a portion of the surface groove. The electrical contact element is electrically connected to the mounting bracket to transmit electrical charge from the tube.

20 Claims, 3 Drawing Sheets

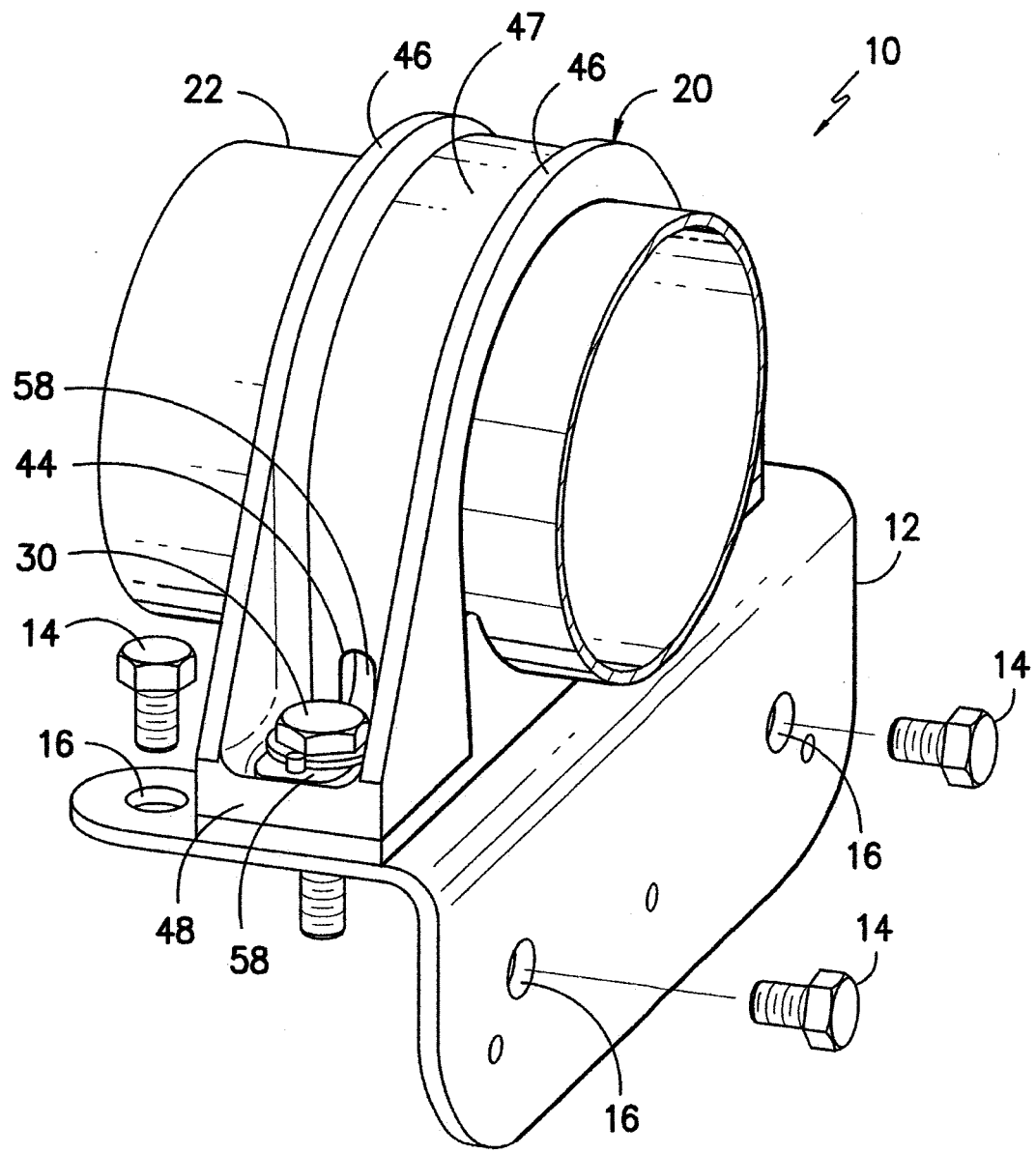
FIG. -1-

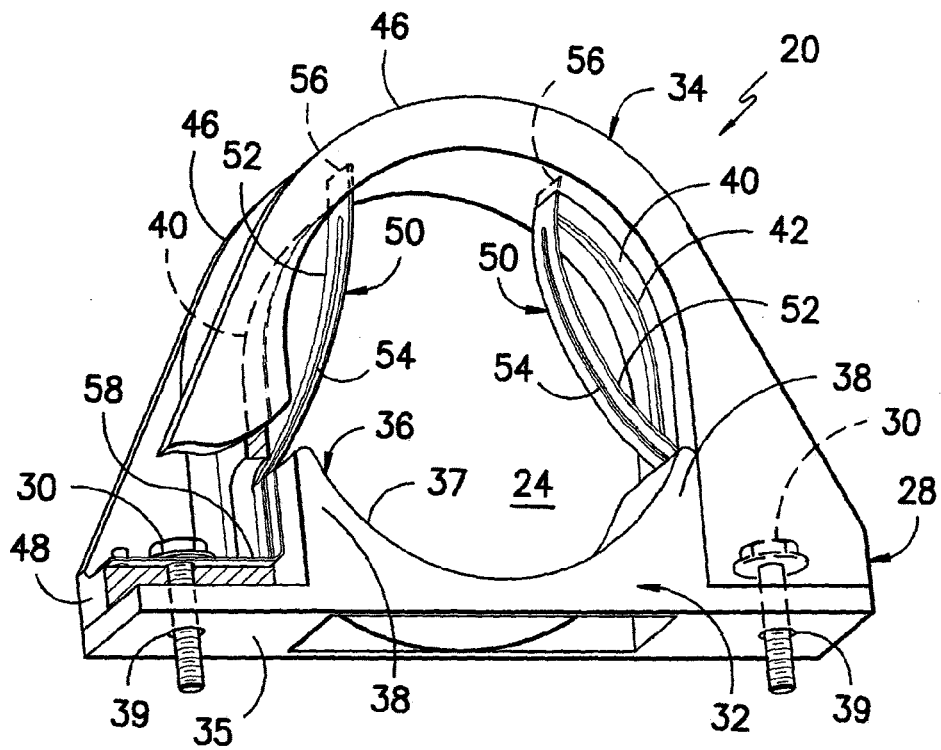
FIG. -2-
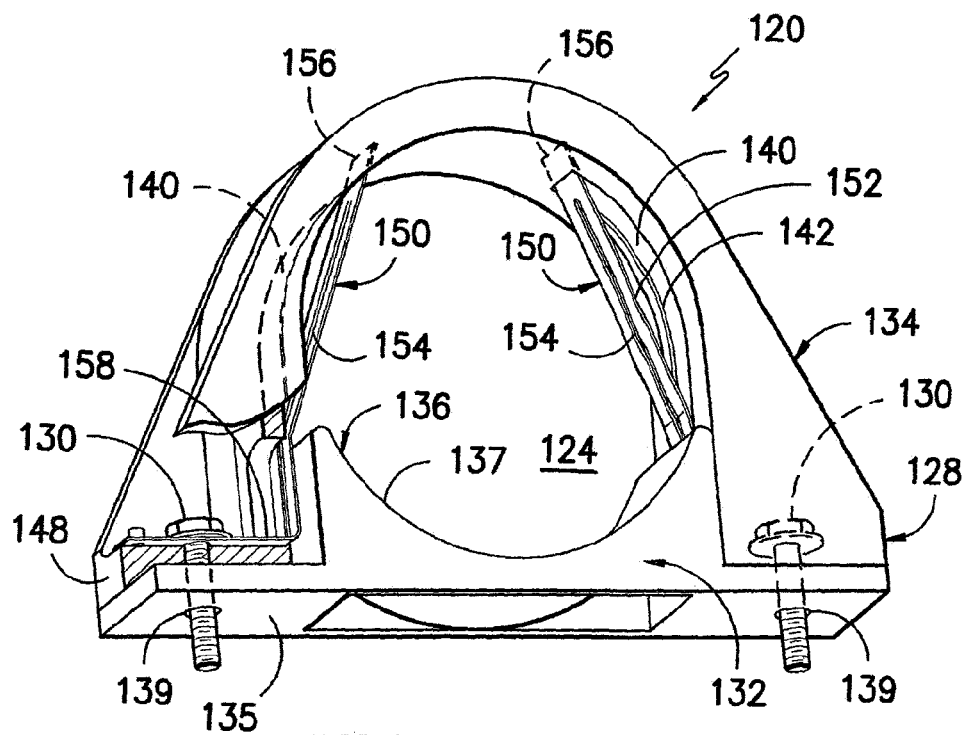
FIG. -4-

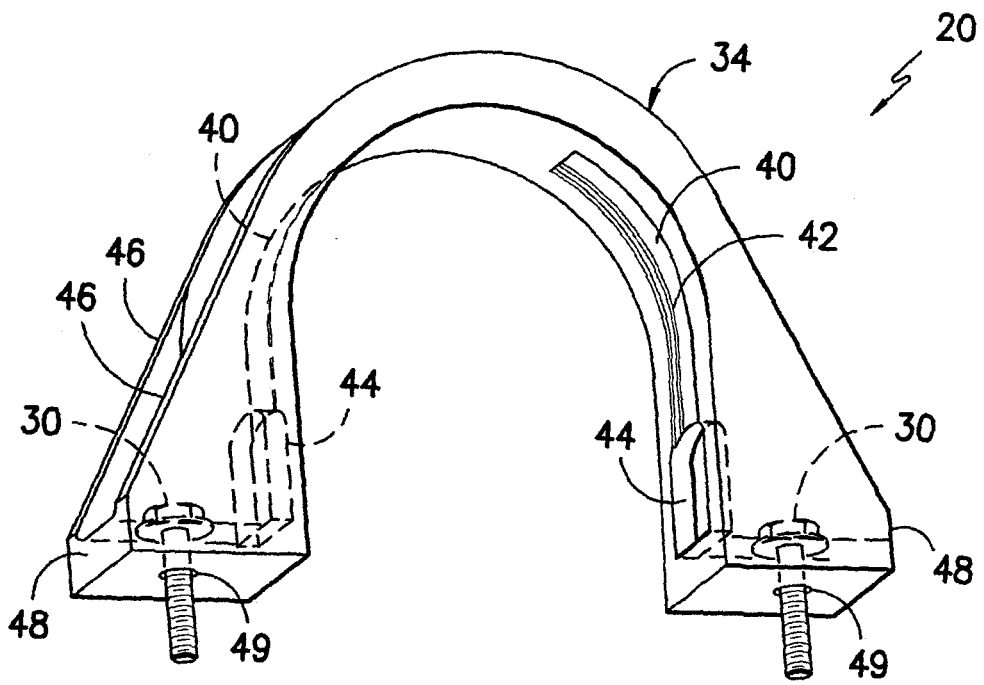
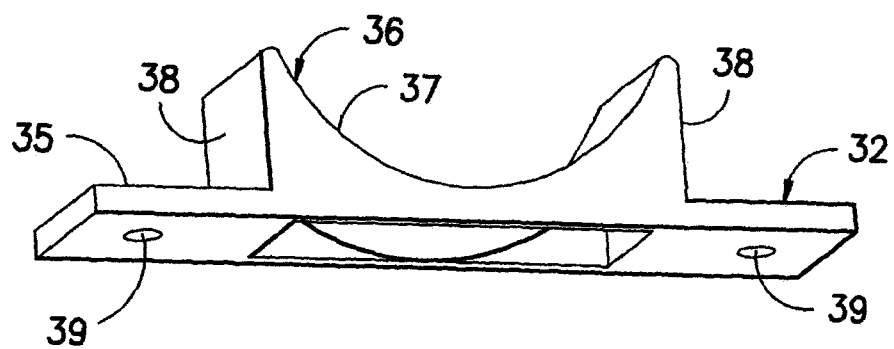
FIG. —3—

SADDLE CLAMP HAVING ELECTRICAL BONDING CHARACTER

CROSS-REFERENCE TO RELATED APPLICATION

This non-provisional application is national phase of PCT/US2010/054049 filed Oct. 26, 2010, and claims the benefit of, and priority from, U.S. Provisional Application 61/256,693 filed Oct. 30, 2009.

TECHNICAL FIELD

The present invention relates to clamping structures, and more particularly to a saddle clamp adapted to support metal piping or tubing such as a fuel tube or the like in an aircraft or other environment of use. More particularly, the present invention relates to a saddle clamp providing electrical contact between the clamped tubing and a metal support frame or other electrical contact structure.

BACKGROUND OF THE INVENTION

It is known to use plastic saddle clamps to hold piping or tubing in place. One environment of use for such saddle clamps is to support fuel lines or other tubing structures in an aircraft wing. In this environment the saddle clamp is required to accommodate flexing of the fuel line without significantly abrading or otherwise damaging the fuel line. Saddle clamps formed from plastic polymers such as polyamides, polyesters and the like provide these desirable characteristics.

One characteristic of the polymers used in the prior saddle clamps is that they have low electrical conductivity. Thus, friction may cause electrical charges to build up on the fuel lines during use. To avoid accumulation of such electrical charges it has been common to affix a metal ring about the tube and to run a conductive cable to a bolt or other electrical contact element which is electrically coupled to the frame of the aircraft. As will be appreciated, while this arrangement is quite effective in dissipating electrical charge, it requires a number of additional components and connections thereby increasing assembly time. Moreover, since the conductive cables must be attached by a person, there is a possibility that human error may result in one or more of the cables being grounded improperly or not at all. Further, even when all connections are properly made during initial installation, one or more cables may become disengaged during use or routine maintenance thereby reducing the efficiency of the electrical contact system.

In light of the above, it would be desirable to provide a clamp suitable to secure a fuel tube or the like to a support frame wherein the clamp provides inherent electrical contact with the tube being carried without the necessity of using a separate charge dissipation element. It would also be desirable for such a clamp to retain the ability to avoid surface abrasion of the tube being carried.

SUMMARY OF THE INVENTION

The present invention offers advantages and alternatives over the prior art by providing a saddle clamp which incorporates internal electrical bonding elements adapted to maintain electrical contact with a clamped tube structure without transferring structural load between the tube and the electrical bonding components. Electrical contact connections are thereby maintained without imparting sliding wear to the tubing and the need to use external electrical contact wire connections is reduced or eliminated. Accordingly, such an arrangement substantially reduces complexity while providing enhanced electrical coupling and charge dissipation.

In accordance with one exemplary aspect, the present invention provides a saddle clamp providing electrical bonding with a tube secured in place within the saddle clamp. The saddle clamp includes a base segment adapted for operative connection to a mounting bracket and an arch segment extending away from the base segment. The arch segment has an inner tube contacting surface. The inner tube contacting surface includes at least one surface groove and at least one window opening extends through the arch segment to define a passageway from the inner tube contacting surface to the exterior of the arch segment. At least one electrical contact element extends between portions of the inner tube contacting surface. The electrical contact element includes a tube contact segment disposed in opposing relation to a portion of the surface groove. The electrical contact element further includes a proximal portion extending through the window opening. The proximal portion is electrically connected to the mounting bracket to transmit electrical charge from the tube.

Other exemplary aspects and advantages of the invention will become apparent from a detailed description of certain presently preferred embodiments which are shown in the accompanying drawings.

BRIEF DESCRIPTION OF THE DRAWINGS

FIG. 1 is a schematic view illustrating an exemplary saddle clamp in accordance with the present invention in clamping relation to a tube;

FIG. 2 is a partial breakaway schematic perspective view of an exemplary saddle clamp in accordance with the present invention illustrating internal flexible electrical contact strips of inwardly bowed configuration adapted to contact a surface of a tube (not shown);

FIG. 3 is an exploded view of the exemplary saddle clamp construction of FIG. 2 with the flexible contact strips removed; and FIG. 4 is a partial breakaway schematic perspective view of a second embodiment of an exemplary saddle clamp in accordance with the present invention incorporating internal flexible electrical contact strips of substantially straight geometry.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF THE PREFERRED EMBODIMENTS

Exemplary embodiments of the invention will now be described in reference to the drawings, wherein like reference numerals designate like elements in the various views. Referring now to the drawings, in FIG. 1, an improved exemplary tube clamping system 10 is shown. As illustrated, the exemplary tube clamping system 10 incorporates a metal bracket 12 which may be attached to a portion of a metal support structure (not shown) by use of connection bolts 14 extending through attachment openings 16 in a manner as will be well known to those of skill in the art. By way of example only, the support structure may be a portion of an aircraft frame although the clamping system 10 may likewise be used in conjunction with virtually any support structure arrangement in numerous alternative environments of use. Without limitation, such alternative environments of use may include petrochemical plants, ground-based fuel storage depots, fuel tanker trucks and the like.

As shown, the exemplary tube clamping system 10 includes a saddle clamp 20 which is adapted for disposition in supporting wrap-around relation to a metal tube 22 so as to hold the tube firmly in place. By way of example only, and not limitation, the tube 22 may be a fuel line used in the transport of jet fuel from storage tanks to engines in an aircraft. Tubes of aluminum-based alloys may be particularly preferred due to low weight, although other materials may be used if desired. As shown, the exemplary saddle clamp 20 includes an axial passageway 24 (FIG. 2) for receipt and retention of the tube 22. In the illustrated configuration, lateral feet 28 project radially outwardly away from the axial passageway 24 for disposition in overlying relation to the surface of the bracket 12. In the illustrated exemplary construction, each of the lateral feet 28 includes one or more acceptance openings for receipt of a metal coupling fastener 30 which extends between the saddle clamp 20 and the underlying bracket 12 to establish both physical and electrical connection between the saddle clamp 20 and the bracket 12. As will be appreciated, although the coupling fastener is illustrated as a bolt, it is contemplated that virtually any fastener structure that provides electrical and physical connectivity with the bracket 12 may be used.

As best illustrated through joint reference to FIGS. 2 and 3, the saddle clamp 20 may have a two-part design including a base segment 32 and an overlying arch segment 34. As shown, the base segment 32 includes a platform 35 and a raised support cradle 36 extending upwardly away from the platform 35. In the illustrated exemplary construction, the raised support cradle 36 includes a pair of lateral arm projections 38 extending upwardly away from the platform 35 with a depressed curved surface 37 running between the arm projections to define the bottom of the axial passageway 24 providing cradling support for the tube 22. Segments of the platform 35 project outboard from both sides of the support cradle 36 to define lower portions of the lateral feet 28. Acceptance openings 39 extend through the outboard portions of the base 32 for receipt of the coupling fasteners 30 upon final assembly as will be described further hereinafter.

The base segment 32 may be formed from any suitable plastic material such as heat stabilized polyamide, polyester, ABS or the like as may be desired. In this regard, Nylon 6/6 may be particularly preferred. By way of example only, and not limitation, the base segment 32 may be formed as a unitary structure by techniques such as injection molding or the like. Of course, other materials of construction and formation techniques may be used if desired.

The interior of the arch segment 34 is adapted to fit in sliding relation over the support cradle 36 such that outer surfaces of the lateral arm projections 38 are disposed in close, opposing relation to the lower inner surfaces of the arch segment 34. In this regard, the interior of the arch segment 34 is preferably defined by an upper curved surface forming the top of the axial passageway 24 with substantially straight lower segments for disposition in opposing relation to outer surfaces of the lateral arm projections 38 on the support cradle 36.

As illustrated, in the exemplary embodiment the inner surface of the arch segment 34 includes surface grooves 40 disposed on either side of the arch segment 34. In the illustrated exemplary embodiment, the surface grooves 40 extend circumferentially along the inner surface of the arch segment 34. The surface grooves 40 may have a substantially flat-bottom construction, although other configurations may be used if desired. The surface grooves 40 may extend along the segment of the inner surface forming the transition between the upper curved surface and the adjacent lower straight surfaces on each side of the arch segment. In this regard, the surface grooves 40 preferably intersect with window openings 44 on either side of the arch segment 34. The window openings 44 define passageways between the interior and the exterior of the arch segment 34 and are preferably disposed at positions such that they are at least partially covered by outer surfaces of the arm projections 38 of the support cradle 36 when the saddle clamp 20 is in the assembled condition as shown in FIG. 2.

As shown, one or more raised ridges 42 may extend longitudinally along the length of the surface grooves 40. However, such raised ridges may likewise be eliminated if desired. As will be described further hereinafter, such raised ridges may promote seated acceptance of electrical contact strips within the surface grooves 40 during use.

As best seen in FIG. 1, in the exemplary configuration, the exterior of the arch segment 34 includes a pair of circumferential raised walls 46 which are spaced apart in the axial direction of the clamp to define a circumferential depression 47 between the circumferential raised walls 46. The circumferential raised walls 46 may have a generally arched configuration with variable height relative to the circumferential depression 47 about the circumference of the arch segment 34. As shown, the height difference between the raised walls 46 and the circumferential depression 47 may be greatest at the ends of the legs in which the window openings 44 are located thereby providing additional strength in those zones with little or no differential height at the top of the arch.

In the illustrated exemplary construction, the arch segment 34 includes lateral platform projections 48 which define upper portions of the lateral feet 28. As shown, acceptance openings 49 extend through the platform projections 48 for alignment with the acceptance openings 39 in the platform 35 of the base segment 32. Accordingly, the coupling fastener 30 may run through the aligned acceptance openings 39, 49 for connection with the bracket 12. In the illustrated construction, the acceptance openings 49 in the platform projections 48 are oriented at positions between lower portions of the circumferential raised walls 46. As will be appreciated, in this arrangement the coupling fastener 30 is seated between raised wall segments thereby providing additional protection against damage during use.

The arch segment 34 may be formed from any suitable plastic material such as heat stabilized polyamide, polyester, ABS or the like as may be desired. In this regard, Nylon 6/6 may be particularly preferred. The material forming the arch segment 34 may be the same as the material forming the base segment 32 although different materials may be used if desired. By way of example only, and not limitation, the arch segment 34 may be formed as a unitary structure by techniques such as injection molding or the like. Of course, other materials of construction and formation techniques may be used if desired.

As best seen in FIG. 2, in the exemplary configuration, one or more conductive electrical contact elements 50 may be disposed at the interior of the arch segment 34 extending in crossing relation between portions of the inner surface surrounding the axial passageway 24. By way of example only, the electrical contact elements 50 may be metal strips of substantially flat ribbon configuration formed from thin, flexible, spring-like material. Such structures may be formed by techniques such as stamping or other metal forming processes. One exemplary material which may be used for formation of such metal strips is a beryllium-copper alloy with a cadmium coating, although other metallic or non-metallic materials possessing substantial resiliency and electrical conductivity may be used if desired.

In the illustrated exemplary arrangement the electrical contact elements 50 each include a tube contact segment 52 extending between surfaces at the perimeter of the axial passageway 24. Each of the electrical contact elements 50 preferably has an effective width which is slightly less than the width of the opposing surface groove 40 such that the electrical contact elements can be received fully within the opposing surface grooves upon the application of force in the radial direction. In the illustrated exemplary construction a longitudinal slot 54 extends along the tube contact segment 52 thereby causing the tube contact segment to have a split construction. The slot 54 may extend partially along the length of the electrical contact element 50 and preferably has a width adequate to accept the raised ridge 42 in the opposing surface groove 40 when the tube contact segment 52 is pressed into the surface groove 40.

In the illustrated exemplary configuration, the electrical contact elements 50 each include a distal portion 56 secured in embedded relation within the curved portion of the arch segment 34 of the saddle clamp 20. By way of example only and not limitation such an embedded relation may be established by press fitting the distal portion 56 into an acceptance slot at the interior of the arch segment. Of course, other techniques for anchoring the electrical contact elements 50 in place may likewise be used.

As best seen through joint reference to FIGS. 1 and 2, each of the electrical contact elements 50 includes a proximal portion 58 which extends between an outer surface of the support cradle 36 and the opposing inner surface of the arch segment 34. In the illustrated exemplary embodiment, the proximal portion 58 extends through the window opening 44 and is ultimately anchored in place at the surface of the platform projection 48 by the coupling fastener 30 which projects through an eyelet opening positioned in alignment with acceptance openings 39, 49. Thus, when the coupling fastener 30 is inserted through the opening in the proximal portion 58, and into engagement with the bracket 12, a continuous electrical connection is established between the electrical contact element 50 and bracket 12 as well as with the frame upon which the bracket is mounted. Thus, static charge may be dissipated from the tube 22 by the contact elements 50. In this regard, it will be understood that while the exemplary embodiment employs two contact elements 50, a larger or smaller number may be used as desired.

In the embodiment illustrated in FIG. 2, the tube contact segments 52 of the contact elements 50 are flexed to an inwardly bowed configuration. As will be appreciated, such a configuration causes portions of the tube contact segments to project to a radially inward position within the axial passageway 24. During use, when the tube 22 is inserted into the axial passageway 24, the electrical contact elements 50 will contact the outer surface of the tube 22 and the tube contact segments 52 are urged radially outwardly towards the perimeter of the arch segment. As the tube contact segments 52 are pressed outwardly, they conform about the surface of the tube 22 and apply a continuous biasing force against the tube surface. The tube contact segments 52 are ultimately pressed into the opposing surface grooves 40. However, due to the continuous biasing force of the tube contact segments 52 against the surface of the tube 22, continuous contact is nonetheless maintained. In this regard, the use of the inwardly bowed configuration may aid in maintaining contact due to the enhanced inward biasing force provided by such a construction.

As will be appreciated, the spring-like materials forming the electrical contact elements 50 may be substantially harder than the material forming the tube 22 being clamped. However, because the tube contact segments 52 are pressed into the surface grooves 40, the electrical contact elements 50 are prevented from substantially damaging the tube 22 during use. In this regard, the surface grooves 40 are preferably slightly deeper than the thickness of the corresponding electrical contact elements 50. Thus, when the tube contact segments 52 are pressed into the surface grooves 40 by the tube 22, the inner surface of the tube contact segments 52 moves to a position substantially flush with the adjacent inner surfaces of the arch segment 34. Thus, the tube contact segments 52 do not form a raised abrasive surface. Nonetheless, electrical contact is maintained due to the continuous outward biasing force provided by the tube contact segments 52. In this condition the structural load continues to be carried between the low friction inner surface of the arch segment 34 and the outer surface of the tube 22.

As will be appreciated, maintaining a continuous contact between the tube 22 and the tube contact segments 52 of the electrical contact elements 50 ensures the avoidance of static charge build-up and attendant spark generation. Specifically, any electrical charge is grounded through the connection between the coupling fastener 30 and the underlying bracket 12. Accordingly, electrical charge is continuously dissipated without the need for any external electrical connection thereby reducing complexity and increasing effectiveness.

FIG. 4 illustrates an alternative embodiment of the present invention wherein elements corresponding to those previously described are designated by corresponding reference numbers increased by 100. This embodiment operates in the same manner as previously described but incorporates electrical contact elements 150 having substantially linear tube contact segments 152. As will be appreciated, in this arrangement the tube contact segments 152 may apply a slightly lower inwardly biasing force and may tend to conform about the tube with slightly less resistance. It is contemplated that such a structure may be particularly beneficial for larger diameter tubes or in environments where low biasing forces against the tube are considered desirable.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments and equivalents to the extent permitted by the prior art.

Various features of the invention are set forth in the following claims.

What is claimed is:

1. A saddle clamp providing electrical bonding with a tube secured in place within the saddle clamp, the saddle clamp comprising:
   a base segment adapted for operative connection to a mounting bracket; and
   an arch segment extending away from the base segment, the arch segment having an inner tube contacting surface, the inner tube contacting surface including at least one surface groove, wherein at least one window opening extends through the arch segment to define a passageway from the inner tube contacting surface to the an exterior of the arch segment; and
   at least one electrical contact element extending between portions of the inner tube contacting surface, said at least one electrical contact element including a tube contact segment disposed in opposing relation to a portion of said at least one surface groove, and wherein said at least one electrical contact element further includes a proximal portion extending through said at least one window opening, the proximal portion being electrically connected to the mounting bracket to transmit electrical charge from the tube.

2. The saddle clamp as recited in claim 1, wherein the base segment includes a mounting platform and a support cradle having a trough profile.

3. The saddle clamp as recited in claim 2, wherein the support cradle is disposed in sliding relation at the interior of the arch segment with a lateral side of the support cradle disposed in opposing relation to said at least one window opening.

4. The saddle clamp as recited in claim 3, wherein the arch segment includes at least one platform projection extending outwardly away from said at least one window opening, and wherein the proximal portion of said at least one electrical contact element projects through said at least one window opening and is secured at said at least one platform projection by a coupling fastener extending through said at least one platform projection and operatively connected to the mounting bracket.

5. The saddle clamp as recited in claim 1, wherein said at least one electrical contact element is a metal strip of ribbon construction.

6. The saddle clamp as recited in claim 5, wherein said at least one electrical contact element includes an inwardly bowed tube contact segment extending between inner surfaces of the arch segment.

7. The saddle clamp as recited in claim 6, wherein the tube contact segment includes at least one longitudinal slot extending at least partially along the length of the tube contact segment.

8. The saddle clamp as recited in claim 5, wherein said at least one electrical contact element includes a substantially straight tube contact segment extending between inner surfaces of the arch segment.

9. The saddle clamp as recited in claim 8, wherein the tube contact segment includes at least one longitudinal slot extending at least partially along the length of the tube contact segment.

10. A saddle clamp providing electrical bonding with a tube secured in place within the saddle clamp, the saddle clamp comprising:
    a base segment of polymeric material adapted for operative connection to a mounting bracket, the base segment including a mounting platform and a support cradle extending away from one side of the mounting platform, the support cradle having a trough profile including a concave tube support surface; and
    an arch segment of polymeric material extending upwardly away from the base segment, the arch segment having an inner tube contacting surface having an upper curved portion with curvature opposite to the concave tube support surface at the support cradle and being disposed in opposing relation to the concave tube support surface at the support cradle, the inner tube contacting surface further having a pair of opposing substantially straight side portions extending away from either end of the upper curved portion towards the base segment, the inner tube contacting surface including a pair of circumferential surface grooves extending from the upper curved portion to corresponding window openings extending from the inner tube contacting surface to the an exterior of the arch segment; and
    a pair of electrical contact elements in the form of resilient metal strips of ribbon construction extending in crossing relation between portions of the inner tube contacting surface, each of the electrical contact elements including a tube contact segment extending between the upper curved portion and an adjacent straight side portion of the inner tube contacting surface in opposing relation to a surface groove adapted to receive said segment therein, and wherein each of the electrical contact elements further includes a proximal portion extending through a window opening and secured in place by a coupling fastener extending between the base segment and the mounting bracket.

11. The saddle clamp as recited in claim 10, wherein the support cradle is disposed in sliding relation at the interior of the arch segment with lateral sides of the support cradle disposed in opposing relation to said window openings.

12. The saddle clamp as recited in claim 10, wherein the arch segment includes platform projections extending outwardly away from said window openings, and wherein each of the proximal ends of the electrical contact elements is secured at one of the platform projections by a coupling fastener extending through the platform projection and operatively connected to the mounting bracket.

13. The saddle clamp as recited in claim 10, wherein at least one of the electrical contact elements includes an inwardly bowed tube contact segment.

14. The saddle clamp as recited in claim 13, wherein the inwardly bowed tube contact segment includes at least one longitudinal slot extending at least partially along the length of the tube contact segment.

15. The saddle clamp as recited in claim 14, wherein an opposing one of the surface grooves includes a circumferentially disposed ridge adapted for receipt within the longitudinal slot when the tube contact segment is pressed into the opposing one of the surface grooves.

16. The saddle clamp as recited in claim 10, wherein at least one of the electrical contact elements includes a substantially straight tube contact segment.

17. The saddle clamp as recited in claim 16, wherein the substantially straight tube contact segment includes at least one longitudinal slot extending at least partially along the length of the tube contact segment.

18. The saddle clamp as recited in claim 17, wherein an opposing one of the surface grooves includes a circumferentially disposed ridge adapted for receipt within the longitudinal slot when the tube contact segment is pressed into the opposing one of the surface grooves.

19. A saddle clamp providing electrical bonding with a tube secured in place within the saddle clamp, the saddle clamp comprising:

a base segment of polymeric material adapted for operative connection to a mounting bracket, the base segment including a mounting platform and a support cradle extending away from one side of the mounting platform, the support cradle having a trough profile defined by a pair of lateral arm projections with a concave tube support surface disposed between the lateral arm projections, wherein the mounting platform includes at least one acceptance opening extending through the mounting platform adapted for receipt of a coupling fastener providing electrical connection with the mounting bracket; and an arch segment of polymeric material extending upwardly away from the base segment, the arch segment having an inner tube contacting surface having an upper curved portion with curvature opposite to the concave tube support surface at the support cradle and being disposed in opposing relation to the concave tube support surface at the support cradle, the inner tube contacting surface further having a pair of opposing substantially straight side portions extending away from either end of the upper curved portion towards the base segment, the inner tube contacting surface including at least one surface groove extending at least partially along the upper curved portion and an adjacent straight side portion, and wherein the arch segment includes a pair of outwardly extending platform projections extending radially away from the exterior of the straight side portions, and wherein at least one of the platform projections includes at least one acceptance opening extending through the platform projection in alignment with the acceptance opening extending through the mounting platform for receipt of the coupling fastener providing electrical connection with the mounting bracket and wherein window openings extend through the straight side portions defining passageways from the inner tube contacting surface to the an exterior of the arch segment; and a plurality of electrical contact elements extending in crossing relation between portions of the inner tube contacting surface, at least one of the electrical contact elements being in the form of resilient metal strip of ribbon construction including a tube contact segment extending between the upper curved portion and an adjacent straight side portion of the inner tube contacting surface in opposing relation to a surface groove adapted to receive said tube contact segment therein, and wherein said at least one of the electrical contact elements further includes a proximal portion extending through a window opening and secured in place by the coupling fastener.

20. The saddle clamp as recited in claim 19, wherein the surface groove has a shallow, flat-bottom profile with at least one longitudinal ridge running at least partially along the length of the surface groove and said at least one of the electrical contact elements includes an inwardly bowed tube contact segment having at least one longitudinal slot extending at least partially along the length of the tube contact segment adapted to receive said at least one longitudinal ridge when the tube contact segment is pressed into the surface groove.

* * * * *